United States Patent [19]
Ohtani et al.

[11] Patent Number: 5,278,250
[45] Date of Patent: Jan. 11, 1994

[54] PROCESS FOR PREPARING ORGANIC BINDER

[75] Inventors: Takamitsu Ohtani; Kazuyuki Hagino, both of Kyoto; Hiromitsu Kinoshita, Osaka; Akira Taniuchi; Norimasa Uesugi, both of Kyoto, all of Japan

[73] Assignees: Dei-ichi Ceramo Co., Limited, Kanzaki, Japan; Dai-ichi Kogyo Seiyaku Co., Ltd., Kyoto, Japan

[21] Appl. No.: 677,928

[22] Filed: Apr. 1, 1991

[51] Int. Cl.$^5$ .......................... C08F 265/04
[52] U.S. Cl. ..................... 525/309; 525/67; 525/69; 525/70; 524/504; 252/302
[58] Field of Search ............ 525/309, 67, 69, 70; 524/504; 252/302

[56] References Cited

U.S. PATENT DOCUMENTS 4,492,783  1/1985  Tanaka et al. ............ 524/430

FOREIGN PATENT DOCUMENTS 60-223810  11/1985  Japan.

Primary Examiner—John Kight, III
Assistant Examiner—Duc Truong
Attorney, Agent, or Firm—Varndell Legal Group

[57] ABSTRACT

A process for preparing an organic binder which is suitable for use in the preparation of a sintered body of an inorganic powder such as a metallic powder or a ceramic powder, and which is superior in compactibility of the inorganic powder, removability from compacts of the inorganic powder prior to sintering, and yield and quality of sintered body, the process comprising the steps of dissolving (a) an ethylene-vinyl acetate copolymer and/or an ethylene-ethyl acrylate copolymer in (b) an acrylic or methacrylic acid ester or a mixture thereof with a styrene compound, dispersing the resulting solution in an aqueous medium containing a dispersing agent, and carrying out a suspension polymerization in the presence of a polymerization initiator such as an oil-soluble initiator.

7 Claims, 4 Drawing Sheets

PROCESS FOR PREPARING ORGANIC BINDER

BACKGROUND OF THE INVENTION

The present invention relates to a process for preparing an organic binder suitable for use in compacting an inorganic powder such as a powder of ceramic material (hereinafter referred to as "ceramic powder") or a metallic powder and sintering the resulting compact. More particularly, the present invention relates to a process for preparing an organic binder which has a good compactibility of inorganic powders in injection compacting or extrusion compacting and a good binder removability from green compact in the sintering step and which c,,,an provide sintered bodies having no or little defects and a good dimensional stability in high yields.

Sintered bodies have been prepared by compacting a mixture of an inorganic powder with an organic binder, and sintering the resulting compact. As the organic binder, there have been used, for instance, waxes and polymers such as ethylene-vinyl acetate copolymer (EVA), polystyrene, polypropylene, polyethylene and acrylic polymers. The organic binders used in the preparation of sintered bodies are required to have good characteristics such as compatibility (e.g. compacting stability and powder flowability in compacting inorganic powders to which the binders are added, the flowability of a mixture of an inorganic powder and a binder being hereinafter referred to as "flowability in compacting"), strength of green compacts, removability of binder from green compacts by thermal decomposition prior to the sintering, shape retainability in sintering and amount of residual carbon. However, known binders have both merits and demerits and are not always satisfactory in these characteristics.

For instance, the wax binders have a good removability, but have the drawbacks that they are poor in compactibility due to high crystallinity and the obtained green compacts are low in strength.

In general, the polymer binders are superior in compactibility, but have the drawback of being poor in removability. Mentioning the compactibility of polymer binders, polystyrene provides green compacts having a satisfactory strength and accordingly it is hard to cause jetting, but it is poor in powder flowability in compacting due to high melting point. Ethylene-vinyl acetate copolymer (EVA) is superior in powder flowability in compacting and provides an elasticity to green compacts, but defects such as blister and cracks are easy to occur in removing the binder by thermal decomposition. Acrylic polymers provide green compacts having a high strength, but are poor in mold releasing property of green compacts.

In view of such circumstances and in order to meet a recent demand for a binder which is suitable for the preparation of small-sized compacts having a complicated shape, it has been attempted to provide a mixed binder having well balanced characteristics by blending the acrylic polymer as a main component which is somewhat inferior in mold releasing property to other polymer binders, but is superior in binder removability, with other polymer binders such as polystyrene, ethylene-vinyl acetate copolymer or polyethylene. However, a difficulty is encountered in obtaining a homogeneous mixture by admixing such known polymer binders, because they differ from each other in form and softening point and also because the solubility or compatibility is not satisfactory. For example, the solubility parameters [SP values, $(Cal/cm^3)^{\frac{1}{2}}$] of these polymers are 9.10 for polystyrene, 8.49 for a copolymer of ethylene and vinyl acetate in a ratio of 70:30 by weight, and 9.25 for polymethyl methacrylate. In a mixture of these polymers, the polymers are not compatible with each other and, therefore, if such a mixed polymer binder is admixed with an inorganic powder, no uniform mixture is obtained. A nonuniform mixture of an inorganic powder and a binder has problems that it takes time to determine the compacting conditions since the flowability in compacting is not stabilized, the yield is lowered, defects such as warpage, crack and sink mark are easy to occur in the obtained sintered bodies and the use of nonuniform mixture also has a bad effect on dimensional accuracy and density of the products.

It is an object of the present invention to provide an organic binder which is suitable for use in the preparation of a sintered body of an inorganic powder such as ceramic powder or metallic powder and which is superior in flowability of a mixture with the inorganic powder and in removability by thermal decomposition prior to sintering the green compact obtained from the mixture with the inorganic powder and which can provide in a high yield a sintered body having no defects such as warpage, crack and sink mark and having a high dimensional accuracy and a predetermined density.

Another object of the present invention is to provide a process for preparing an organic binder having excellent characteristics as mentioned above.

These and other objects of the present invention will become apparent from the description hereinafter.

SUMMARY OF THE INVENTION

In accordance with the present invention, there is provided a process for preparing an organic binder suitable for use in preparing a sintered body of an inorganic powder which comprises the steps of:

(1) dissolving (a) a polymer selected from the group consisting of an ethylene-vinyl acetate copolymer and an ethylene-ethyl acrylate copolymer in (b) an acrylic or methacrylic acid ester monomer or a mixture of an acrylic or methacrylic acid ester monomer and a styrene compound monomer, (2) dispersing the resulting solution in an aqueous medium in the presence of a dispersing agent, and (3) subjecting the resulting dispersion to a suspension polymerization.

BRIEF DESCRIPTION OF THE DRAWINGS

FIGS. 1 to 4 are microphotographs of organic binders treated by etching with a solvent so as to reveal the inner structure of the binder particles, observed by a scanning electron microscope of 5,000 magnifications, wherein FIGS. 1 and 3 show microphotographs of binder particles prepared according to the present invention, and FIGS. 2 and 4 show microphotographs of binder particles prepared by blending two or more polymers.

DETAILED DESCRIPTION

Figure 1:

In the process of the present invention, the component (a), i.e. an ethylene-vinyl acetate copolymer and/or an ethylene-ethyl acrylate copolymer, and a polymerization initiator are dissolved in the monomer component (b), i.e. an acrylic or methacrylic acid ester alone or a mixture of an acrylic or methacrylic acid ester and styrene, and the resulting solution is dispersed in an aqueous medium containing a dispersing agent to form a suspension polymerization system. A chain transfer agent may be used as occasion demands, and it may be added to the above-mentioned solution.

The ethylene-vinyl acetate copolymers (EVA) used in the present invention are not particularly limited, and any of commercially available ethylele-vinyl acetate copolymers can be used. Copolymers of ethylene and vinyl acetate in a ratio of 85/15 to 50/50 by weight, especially 80/20 to 60/40 by weight, are particularly preferred, since if the ratio is more than 85/15 by weight, it becomes hard to dissolve in the monomer component (b), and since if the ratio is less than 50/50 by weight, such copolymers are available with difficulty and also there is a tendency to lower the strength of green compacts. From the viewpoint of the viscosity of the solution of the copolymers dissolved in the monomer component (b), it is preferable that the ethylene-vinyl acetate copolymers are those having a melt index of about 10 to about 500. From the viewpoints of the powder flowability required in compacting and the strength of green compacts, it is more preferable that the copolymers are those having a melt index of about 20 to about 400.

The ethylene-ethyl acrylate copolymers (EEA) used in the present invention are not particularly limited, and any of commercially available ethylene-ethyl acrylate copolymers can be used. Copolymers of ethylene and ethyl acrylate in a ratio of 85/15 to 50/50 by weight, especially 80/20 to 60/40 by weight, are preferred, since if the ratio is more than 85/15 by weight, it becomes hard to dissolve in the monomer component (b), and since if the ratio is less than 50/50 by weight such copolymers are available with difficulty and also there is a tendency to lower the strength of green compacts. From the viewpoint of the viscosity of the solution of the copolymers dissolved in the monomer component (b), it is preferable that the ethylene-ethyl acrylate copolymers are those having a melt index of about 10 to about 2,000. From the viewpoints of the powder flowability in compacting and the strength of green compacts, it is more preferable that the copolymers are those having a melt index of about 100 to about 1,500.

The use of EVA as the component (a) gives organic binders superior particularly in the powder flowability in compacting and the strength of green compacts, and the use of EEA as the component (a) gives organic binders superior particularly in the binder removability.

The acrylic and methacrylic acid esters used as the monomer component (b) are not particularly limited, but from the viewpoints of powder flowability in compacting, strength of green compacts and binder removability, esters of acrylic or methacrylic acid with an alcohol having 1 to 8 carbon atoms are preferred. Examples of the (meth)acrylic acid ester are, for instance, n-alkyl (meth)acrylates having a $C_1$ to $C_8$ alkyl group, isopropyl (meth)acrylate, isobutyl (meth)acrylate, t-butyl (meth)acrylate, 2-ethylhexyl (meth)-acrylate, 2-methoxyethyl (meth)acrylate, 2-ethoxyethyl (meth)acrylate, and the like. Among them, n-alkyl (meth)acrylates having a $C_1$ to $C_4$ alkyl group, isopropyl (meth)acrylate and isobutyl (meth)acrylate are particularly preferred. The (meth)acrylic acid esters may be used alone or in admixture thereof.

The (meth)acrylic acid esters can be used in admixture with a styrene compound. Representative examples of the styrene compound are, for instance, styrene, α-methylstyrene, p-methylstyrene and vinyl styrene.

Preferably, the content of the styrene compound in a mixture of the (meth)acrylic acid ester and the styrene compound is not more than 80% by weight. The flowability of the obtained binder decreases with increasing the amount of styrene compound, thus the use of the styrene compound in a higher proportion tends to lower the compactibility.

Other monomers, e.g. acrylic acid, methacrylic acid, vinyl acetate and vinyl chloride, may be used in a small amount as the component (b) so long as the desired properties of the obtained polymer used as the binder are not substantially impaired.

The polymer component (a) and the monomer component (b) are used in an (a)/(b) ratio of about 5/95 to about 80/20 by weight, preferably about 20/80 to about 70/30 by weight. When the (a)/(b) ratio is less than 5/95 by weight, the powder flowability in compacting is apt to be insufficient. Insufficient flowability is easy to cause bad compacting. When the (a)/(b) ratio is more than 80/20 by weight, blistering may occur when the binder is removed by thermal decomposition, thus resulting in lowering of the strength of sintered body, and also the binder removal and the handling become difficult.

It is preferable to use an oil-soluble polymerization initiator so that the polymerization proceeds in oil droplets dispersed in the aqueous medium, thus polymer particles wherein the polymer component (a) and the polymer formed from the monomer component (b) are uniformly blended, are produced. Representative examples of the polymerization initiator are, for instance, an organic peroxide such as benzoyl peroxide, lauroyl peroxide or t-butyl-peroxy-2-ethylhexanate, an azo compound such as azoisobutylonitrile or azobisdimethylvaleronitrile, and other oil-soluble polymerization initiators. The initiators may be used alone or in admixture thereof. The amount of the initiator is from 0.05 to 1.5 parts by weight, preferably 0.1 to 0.6 part by weight, per 100 parts by weight of the monomer component (b).

Representative examples of the chain transfer agent which may be used in the process of the present invention as occasion demands are, for instance, a mercaptan such as dodecylmercaptan or t-octylmercaptan, α-methylstyrene, and a dimer of α-methylstyrene. The chain transfer agents may be used alone or in admixture thereof. The amount of the chain transfer agent is from 0.01 to 1.0 part by weight, preferably 0.03 to 0.5 part by weight, per 100 parts by weight of the monomer component (b).

It is desirable that the polymer component (a) is completely dissolved in the monomer component (b) so that the reaction proceeds uniformly. The solution is dispersed in an aqueous medium in the presence of a dispersing agent, and the resulting suspension is subjected to a suspension polymerization.

Known dispersing agents can be used in the present invention. Representative examples of the dispersing agent are, for instance, a water-soluble organic high molecular weight compound such as polyvinyl alcohol, hydroxyethyl cellulose or polyvinylpyrrolidone, and a combination of an anionic surface active agent and a fine powder of a slightly water-soluble inorganic compound such as hydroxyapatite or magnesium pyrophosphate. The dispersing agent is used in an amount of 0.1 to 1 part by weight, preferably 0.2 to 0.5 part by weight, per 100 parts by weight of the aqueous medium.

The solution of the polymer component (a) and the initiator in the monomer component (b), which may further contain a chain transfer agent, is dispersed in an aqueous medium, e.g. water, in an amount of 30 to 120 parts by weight, preferably 50 to 100 parts by weight, per 100 parts by weight of the aqueous medium.

The conditions and the like for the suspension polymerization are not particularly limited, thus the suspension polymerization can be conducted in a usual manner. The polymerization temperature is determined according to the decomposition temperature of the polymerization initiator used. The polymerization is usually carried out at a temperature of 50° to 130° C. for 2 to 10 hours.

Figure 3:
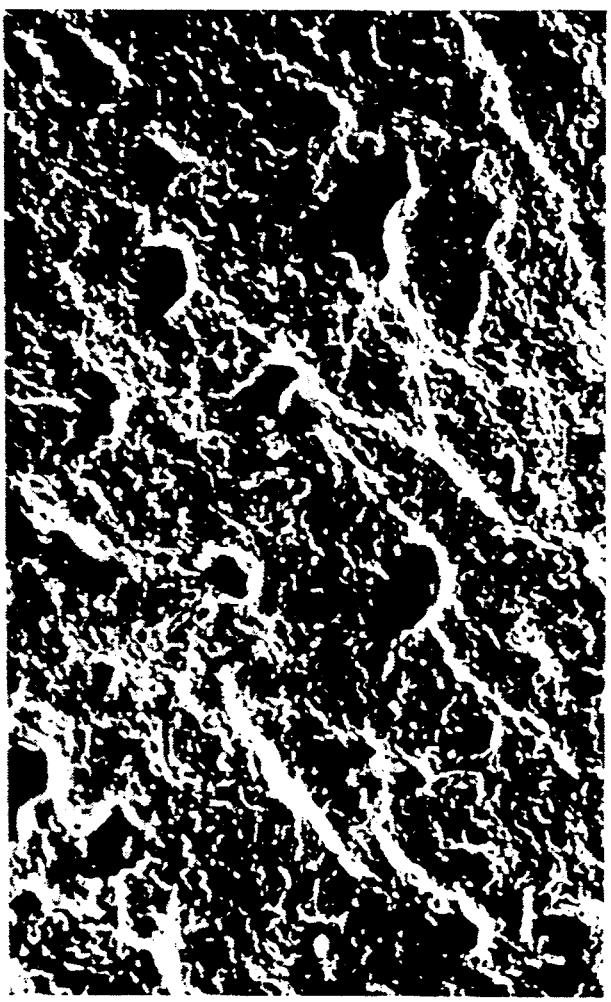

The thus obtained product of the suspension polymerization is a composite polymer wherein the polymer formed from the monomer component (b) is uniformly dispersed in the polymer component (a), as observed in FIGS. 1 and 3 which are microphotographs of polymer particles prepared according to the process of the present invention and etched with a solvent to reveal the inner structure of the particles.

The polymer prepared according to the process of the present invention is useful as a binder for the preparation of sintered bodies of inorganic powders such as metallic powder or ceramic powder. It can be used as the binder in the same manner as known polymer binders. For instance, the polymer according to the present invention which is usually in the form of particles, is added to an inorganic powder having an average particle size of 0.1 to 50 $\mu$m, and they are kneaded at an elevated temperature and then pulverized into a powder to provide a material for compacting and sintering.

Representative examples of the inorganic powder to which the organic binder according to the present invention is applicable, are for instance a metallic powder such as iron, an iron alloy, e.g. iron-nickel alloy, iron-cobalt alloy or stainless steel, tungsten, an aluminum alloy, or a copper alloy; an oxide ceramic powder such as alumina, zirconia, mullite, titanate or ferrite; a nitride ceramic powder such as silicon nitride, aluminum nitride or boron nitride; a carbide ceramic powder such as silicon carbide, aluminum carbide or tungsten carbide; an intermetallic compound such as titanium-aluminum alloy; a phosphate powder such as apatite; and the like.

The inorganic powder may contain 1 to 50% by volume of a fiber or whisker of a metal or an inorganic material other than metals. Examples of the fiber and whisker used in combination with the inorganic powder are, for instance, those of metals such as copper, stainless steel, aluminum, magnesium, nickel, titanium, beryllium, tungsten, molybdenum and boron, and those of inorganic materials other than metals such as alumina, zirconia, silicon carbide, boron carbide, silicon nitride, boron nitride and aluminum nitride.

The present invention is more specifically described and explained by means of the following Examples in which all % and parts are by weight unless otherwise noted. It is to be understood that the present invention is not limited to the Examples.

EXAMPLE 1

A 5 liter reactor was charged with 600 g of n-butyl methacrylate (BMA) and 0.3 g of n-dodecylmercaptan, and the temperature was elevated to 75° C. with stirring. To the reactor were added 900 g of an ethylene-vinyl acetate copolymer (EVA) (commercially available under the trade mark "Ultracen" 722 made by Tosoh Corporation) and 2.4 g of benzoyl peroxide as a polymerization initiator, and they were dissolved in BMA to form an EVA-BMA solution. An aqueous solution of a dispersing agent prepared from 1,840 ml of deionized water and 160 ml of 3% aqueous solution of polyvinyl alcohol was added to the reactor and stirred to suspend the EVA-BMA solution in the aqueous solution. After replacing the polymerization system with nitrogen gas, the polymerization was carried out at 80° C. for 3 hours and then at 100° C. for 2 hours. After cooling the reaction mixture, the produced polymer was taken out of the reactor, washed with water and dried.

The produced polymer was in the form of spherical particles, the particle size of which fell within the range of 0.3 to 1 mm, and had an intrinsic viscosity $[\eta]$ of 0.85 (toluene solution at 30° C.).

EXAMPLE 2

A 5 liter reactor was charged with 700 g of n-butyl methacrylate (BMA), 500 g of styrene and 0.35 g of n-dodecylmercaptan. To the reactor was added 300 g of an ethylene-vinyl acetate copolymer (EVA) (commercially available under the trade mark "Ultracen" 722 made by Tosoh Corporation) with stirring. The temperature was elevated to 75° C. and the EVA was dissolved in the monomer mixture, and 4.8 g of benzoyl peroxide and 0.25 g of t-butylperoxybenzoate were further dissolved therein. To the reactor was added an aqueous solution of a dispersing agent prepared from 1,840 ml of deionized water and a 3% aqueous solution of polyvinyl alcohol and heated at 80° C., and the content was stirred to form an aqueous suspension. After replacing the polymerization system with nitrogen gas, the polymerization was carried out at 80° C. for 5 hours and then at 110° C. for 2 hours. After cooling the reaction mixture, the produced polymer was taken out of the reactor, washed with water and dried to give white spherical particles, the particle size of which fell within the range of 0.3 to 1.0 mm. The I produced polymer had an intrinsic viscosity $[\eta]$ of 0. 70 (toluene solution at 30° C.).

EXAMPLE 3

A 5 liter reactor was charged with 750 g of n-butyl methacrylate (BMA) and 0.3 g of n-dodecylmercaptan. After elevating the temperature to 75° C. with stirring, 750 q of an ethylene-ethyl acrylate (EEA) (commercially available under the trade mark "NUC-6070" made by Nippon Unicar Kabushiki Kaisha) and 3.0 g of benzoyl peroxide were dissolved in BMA. An aqueous solution of a dispersing agent prepared from 1,840 ml of deinoized water and 160 ml of a 3% aqueous solution of polyvinyl alcohol was added to the reactor and stirred to suspend the EAA-BMA solution in the aqueous solution. The atmosphere of the reaction system was replaced with nitrogen gas, and the polymerization was carried out at 80° C. for 4 hours and then at 100° C. for 2 hours. After cooling the reaction mixture, the produced polymer was taken out, washed with water and dried.

The obtained polymer was in the form of spherical particles having a particle size of 0.3 to 1 mm, and had an intrinsic viscosity $[\eta]$ of 0.78 (toluene solution at 30° C.).

COMPARATIVE EXAMPLE 1

A polymer blend was prepared by kneading 90 parts of EVA used in Example 1 and 60 parts of polybutyl methacrylate having a molecular weight of 300,000 by means of mixing rolls at 140° C. for 30 minutes.

COMPARATIVE EXAMPLE 2

A polymer blend was prepared by kneading 30 parts of EVA used in Example 2, 70 parts of polybutyl methacrylate having a molecular weight of 300,000 and 50 parts of polystyrene by means of mixing rolls at 150° C. for 30 minutes.

Figure 4:

The suspension polymerization products obtained in Examples 1 and 2 and the blends obtained in Comparative Examples 1 and 2 were immersed in hexane for 2 minutes for solvent etching treatment in order to observe the inner structure thereof. The etched products and blends were observed by a scanning electron microscope at a magnification of ×5,000. The microphotographs thereof are shown in FIGS. 1 to 4 wherein FIG. 1 is for the polymer of Example 1, FIG. 2 is for the blend of Comparative Example 1, FIG. 3 is for the polymer of Example 2 and FIG. 4 is for the blend of Comparative Example 2.

Figure 2:
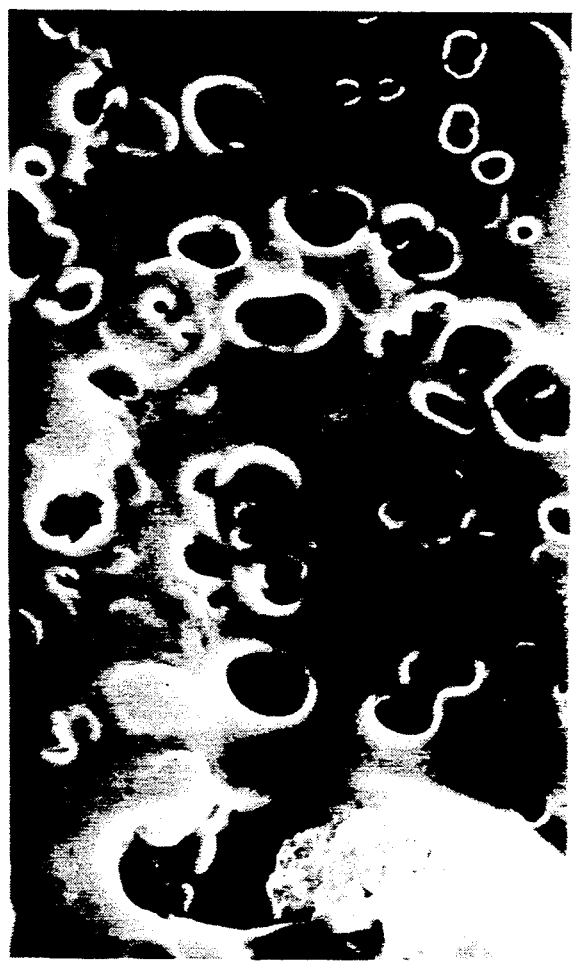

In FIGS. 1 and 2, it is observed that in the EVA-BMA suspension polymerization product of Example 1 the EVA and the polymerized BMA are uniformly dispersed in each other, and there is a marked difference in the state of dispersion between the product of Example 1 and the blend of Com. Ex. 1. In FIGS. 3 and 4, a similar difference is also observed between the EVA-BMA-styrene suspension polymerization product of Example 2 and the blend of Com. Ex. 2.

EXAMPLE 4

Sintered bodies of an inorganic powder were prepared by using the polymers prepared in Examples 1 to 3 and Comparative Examples 1 to 2 as a binder for compacting the inorganic powder as follows:

To 100 parts of an alumina powder (commercially available under the trade mark "Alumina AES-11", product of Sumitomo Chemical Co., Ltd.) having an average particle size of 0.4 μm were added 18.0 parts of the binder prepared in Example 1, 2 or 3 or Comparative Example 1 or 2, and 2 parts of dibutyl phthalate as a plasticizer. They were admixed by a pressure kneader at 150° C. for 1 hour, and the mixture was pulverized by a bench grinder to give a powder as a compacting material.

The compacting material was compacted under an injection pressure of 500 to 1,100 kg/cm² at a compacting temperature of 130° to 160° C. to give a compact having a thickness of 5 mm, a width of 20 mm and a length of 20 mm. At that time, the compactibility was observed.

The thus obtained compact was heated at a rate of 5° C./hour to 400° C. to remove the binder by the decomposition. The compact was then sintered by further heating at a rate of 100° C./hour to 1,620° C. and maintaining at 1,620° C. for 1 hour.

The sintered compact was estimated with respect to appearance and bulk density.

The compactibility of the compacting material was estimated from the viewpoints of easiness in filling a cavity of a mold and releasability of the compact from the mold. The appearance of the sintered compact was observed visually. The bulk density of the sintered compact was measured according to JIS C 2141.

The results are shown in Table 1.

EXAMPLE 5

A compact of a partially stabilized zirconia powder having a specific surface area of 7 m²/g (trade mark "HSY-30", product of Dai-Ichi Kigenso Kagaku Kogyo Kabushiki Kaisha) was prepared in the same manner as in Example 4.

The compact was sintered by heating at a rate of 5° C./hour to 400° C. in order to remove the binder, and then heating at a rate of 100° C./hour to 1,500° C. and maintaining at that temperature for 1 hour.

The results are shown in Table 1.

TABLE 1

| Binder | Example 4 (Alumina) | | | Example 5 (Zirconia) | | |
|---|---|---|---|---|---|---|
| | Compact Compactibility | Sintered body Appearance | Sintered body Bulk density | Compact Compactibility | Sintered body Appearance | Sintered body Bulk density |
| Binder of Ex. 1 | good | good | 3.82 | good | good | 5.73 |
| Binder of Ex. 2 | good | good | 3.79 | good | good | 5.70 |
| Binder of Ex. 3 | good | good | 3.82 | good | good | 5.72 |
| Binder of Com. Ex. 1 | bad | deformation | 3.70 | bad | deformation | 5.53 |
| Binder of Com. Ex. 2 | bad | craking and deformation | 3.68 | bad | craking and deformation | 5.58 |

What we claim is:

1. A process for preparing an organic binder suitable for use in preparing a sintered body of an inorganic powder which comprises the steps of:
   (1) dissolving (a) a polymer selected from the group consisting of an ethylene-vinyl acetate copolymer and an ethylene-ethyl acrylate copolymer in (b) an acrylic or methacrylic acid ester monomer or a mixture of an acrylic or methacrylic acid ester monomer and a styrene compound monomer,
   (2) dispersing the resulting solution in an aqueous medium in the presence of a dispersing agent, and
   (3) subjecting the resulting dispersion to a suspension polymerization.

2. The process of claim 1, wherein the solution of the component (a) dissolved in the component (b) contains an oil-soluble polymerization initiator.

3. The process of claim 1, wherein the solution of the component (a) dissolved in the component (b) contains a chain transfer agent.

4. The process of claim 1, wherein the polymer component (a) and the monomer component (b) are used in an (a)/(b) ratio of 5/95 to 80/20 by weight.

5. The process of claim 1, wherein the content of the styrene compound monomer in the mixture of an acrylic or methacrylic acid ester monomer and a styrene compound monomer is at most 80% by weight.

6. The process of claim 1, wherein said aqueous medium is water.

7. The process of claim 1, wherein polymer particles of said organic binder are recovered from said aqueous medium after completion of said suspension polymerization.

* * * * *